US006484343B1

(12) United States Patent
Phillips

(10) Patent No.: US 6,484,343 B1
(45) Date of Patent: Nov. 26, 2002

(54) ADJUSTABLE RAMP

(76) Inventor: Andrew Phillips, 425 Holmes Gap Rd., Watertown, TN (US) 37184

( * ) Notice: Subject to any disclaimer, the term of this patent is extended or adjusted under 35 U.S.C. 154(b) by 0 days.

(21) Appl. No.: 09/871,552

(22) Filed: May 31, 2001

Related U.S. Application Data

(60) Provisional application No. 60/276,176, filed on Mar. 15, 2001.

(51) Int. Cl.$^7$ ................................................. E01D 1/00
(52) U.S. Cl. ......................................................... 14/69.5
(58) Field of Search ............................. 14/69.5; D34/32; 254/88; 482/104

(56) References Cited

U.S. PATENT DOCUMENTS

| | | | | |
|---|---|---|---|---|
| 903,157 A | * | 1/1908 | Allen | 119/847 |
| 2,076,069 A | * | 4/1937 | Davis | 254/88 |
| 2,227,750 A | | 1/1941 | Hinson | 254/88 |
| 2,232,903 A | * | 2/1941 | Day | 254/88 |
| 2,449,829 A | | 9/1948 | Agren | 14/72 |
| 2,607,937 A | | 8/1952 | Stone | 14/72 |
| 3,134,999 A | * | 6/1964 | Reynolds | 14/71.1 |
| 3,426,542 A | * | 2/1969 | Hindman et al. | 405/221 |
| 3,872,948 A | | 3/1975 | Richards | 187/852 |
| 4,013,268 A | * | 3/1977 | Williams | 254/88 |
| 4,155,468 A | | 5/1979 | Royce, deceased | 414/556 |
| 4,396,191 A | * | 8/1983 | Metler | 482/104 |
| 4,488,326 A | | 12/1984 | Cherry | 14/72 |
| 4,635,934 A | * | 1/1987 | Roethke | 482/104 |
| 4,641,837 A | * | 2/1987 | Ruth | 297/377 |
| 4,653,751 A | * | 3/1987 | Green | 482/104 |
| 4,765,616 A | * | 8/1988 | Wolff | 482/104 |
| D298,978 S | * | 12/1988 | Van Buskirk | D34/32 |
| 4,848,732 A | | 7/1989 | Rossato | 254/90 |
| 4,919,419 A | * | 4/1990 | Houston | 482/138 |
| 4,920,598 A | | 5/1990 | Hahn | 14/71 |
| 4,960,277 A | * | 10/1990 | LaRossa et al. | 482/104 |
| 4,974,839 A | * | 12/1990 | Cantor | 482/104 |
| 5,333,340 A | | 8/1994 | Moseley | 14/72 |
| 5,690,314 A | * | 11/1997 | Williams | 254/88 |
| 5,829,947 A | * | 11/1998 | Litten | 14/71.3 |
| 5,921,897 A | * | 7/1999 | Stevens | 482/104 |
| 6,090,021 A | * | 7/2000 | Flowers et al. | 482/104 |
| 6,135,532 A | * | 10/2000 | Martin | 14/71.1 |
| 6,264,586 B1 | * | 7/2001 | Webber | 482/104 |

* cited by examiner

Primary Examiner—Gary S. Hartmann
(74) Attorney, Agent, or Firm—Waddey & Patterson, PC; I. C. Waddey, Jr.

(57) ABSTRACT

A movable ramp is disclosed having a base having a channel therealong, and an upright member extending upwardly from the base. The upright member has a plurality of hooks at differing elevations above the base. A plurality of protrusions extend from a first end of a runway and rest on a hook of the upright member to elevate the first end of the runway above the base. Another protrusion extends outwardly from the runway and slides within the channel of the base to facilitate movement of the first end of the runway relative to the base. In another embodiment, a base has a first end; a frame is fixed to the first end and extends upwardly therefrom. A runway is fixed at its trailing edge to the base. A winch is fixed between the frame and the leading edge of the runway for moving the runway.

15 Claims, 4 Drawing Sheets

ADJUSTABLE RAMP

This application claims benefit of U.S. Patent Application Ser. No. 60/276,176 filed Mar. 15, 2001, entitled "Adjustable Ramp".

BACKGROUND OF THE INVENTION

The present invention relates generally to ramps used to facilitate moving objects, such as lawn mowers, from one elevation to another.

U.S. Pat. No. 2,607,937 to G. B. Stone teaches the use of a pulley positioned at the top of a frame for lifting the leading edge of a ramp into position. The runway of the ramp is raised and lowered via traverse shaft (44), which is rotatably journaled in brackets (46) affixed to cross bar (18). A handle (48) is attached at one end of the shaft (44) and a pair of cables is windable about the shaft (44). The Stone patent fails to teach the use of supporting structures, such as hooks, on both sides of an upright member and cooperating tabs on the side of the runway for manually positioning the runway relative to a base. The Stone patent further fails to teach the use of a channel along the base and tabs on the trailing edge of the runway for maintaining proper alignment of the runway while the runway is moved to different elevations relative to the base.

U.S. Pat. No. 2,449,829 to C. G. Agren teaches the use of a deck that may be raised and lowered by means of a hand-pump carried by a jack cylinder. Notably, the hand pump is positioned beneath the ramp and pushes the ramp into position. The Agren patent fails to disclose the use of a ramp positioning means, such as a winch, positioned above the runway. The Agren patent also fails to teach the use of supporting structures, such as hooks, on both sides of an upright member for manually raising and lowering the runway.

U.S. Pat. No. 4,155,468 to Royce teaches the use of a ramp for facilitating loading and unloading wheel chairs. The motor drive for the ramp assembly is positioned on the vehicle between the two pivotally mounted ramp members to further increase the available space within the vehicle. The Royce patent fails to disclose the use of supporting structures, such as hooks, on both sides of an upright member, for manually raising and lowering the runway. Royce further fails to teach the use of a channel along the base and tabs on the trailing edge of the runway, the tabs sized to fit within the channel, for maintaining proper alignment of the runway while the runway is adjusted to different elevations.

U.S. Pat. No. 5,333,340 to Moseley teaches the use of a mobile elevatable platform fitted with an impact absorbing bumper set at a height above the ground to meet the horizontal bumper on the rear of a truck.

What is needed, then, is a ramp that is easy to build and maintain, that is sturdy and suitable for loading and unloading heavy machinery, that is capable of both manual and electric operation, that utilizes supporting structures and cooperating tabs, or protrusions, for adjusting the elevation of the runway, and that utilizes a guide structure for guiding the rear of the runway when the runway is moved relative to the base.

SUMMARY OF THE INVENTION

It is an object of the present invention to provide a ramp that is relatively easy to build and maintain when compared to conventional ramps.

It is another object of the present invention to provide a ramp that is sturdy and suitable for loading and unloading heavy machinery.

It is still a further object of the invention to provide a ramp that may be operated both manually and automatically.

It is yet another object of the invention to provide a ramp that utilizes supporting structures and cooperating tabs, or protrusions, for adjusting the elevation of the runway relative to a base.

It is still another object of the present invention to provide a ramp that utilizes a guide structure for guiding the rear of the runway when the runway is moved relative to the base.

To overcome the disadvantages of the prior art and to achieve the objects and advantages mentioned above, a ramp is disclosed comprising a base having a first guide structure defined thereon. The first guide structure may take on any suitable structure; in the preferred embodiment, the first guide structure comprises at least one channel along at least a portion of the base.

An upright member is fixed to and extends upwardly from the base. The upright member has a plurality of supporting structures defined thereon at differing elevations above the base. In the preferred embodiment, the supporting structures comprise hooks.

A runway has a first end and a second end. The first end of the runway is movable between a plurality of positions relative to the base. A plurality of supported members is fixed to the first end of the runway and selectively engagable with one of the supporting structures to elevate the first end of the runway above the base. In the preferred embodiment, the supported members comprise a plurality of protrusions, each of which is adapted in size and shape to be received in the corresponding hook and to be operatively engaged therewith.

A second guide structure is fixed to the second end of the runway and is operatively engaged with the first guide structure of the base, so that the second end of the runway may move relative to the base when the elevation of the first end of the runway is adjusted. The second guide structure may take on any structure suitable to accomplish its intended purpose; in the preferred embodiment, the second guide structure comprises a plurality of protrusions, extending outwardly from the runway, wherein each protrusion is adapted in size and shape to be received in the channel of the base.

In another preferred embodiment, a movable ramp is disclosed comprising a base having a first end and a second end, and a frame having a top. The frame is fixed to the first end of the base and extends upwardly therefrom. A runway, having a leading edge and trailing edge, is movable between a plurality of positions relative to the base. The trailing edge of the runway is fixed to the second end of the base and rotatable about at least a portion thereof. A winch is fixed to the top of the frame and connected to the leading edge of the runway for moving the runway between a plurality of positions. The winch may be either electric or manual, depending on the needs of the operator.

DETAILED DESCRIPTION OF THE PREFERRED EMBODIMENTS

Figure 1:
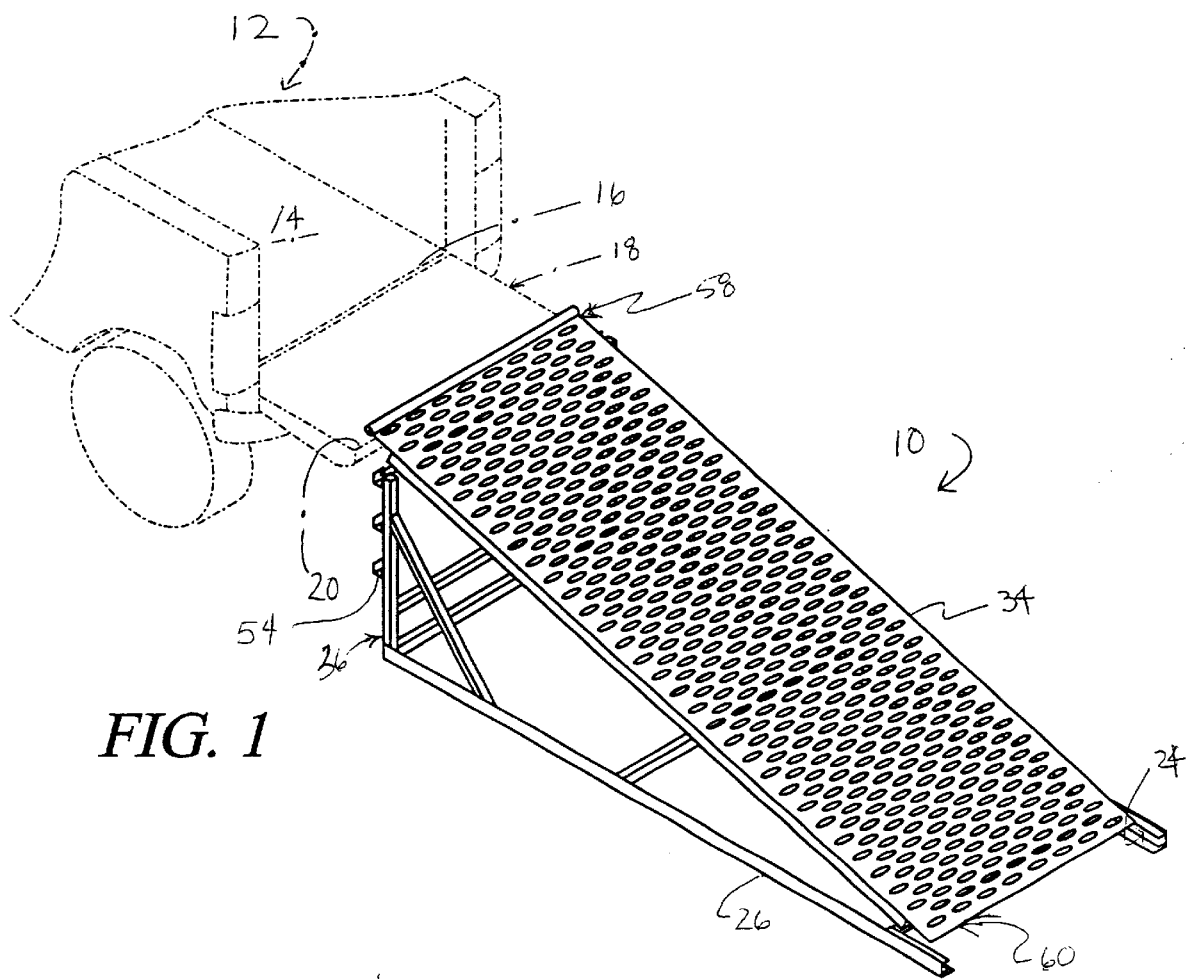
FIG. 1 is an isometric view of an adjustable ramp having a base and a runway, the ramp constructed in accordance with the present invention.

Referring to the drawings in detail, a ramp in accordance with the present invention is shown and generally designated by the reference numeral 10. It should be noted for the sake of clarity that not all of the components and parts of the ramp 10 may be shown and/or marked in all the drawings.

The ramp 10 facilitates the movement of an object, such as a lawn mower, snow blower and the like (not shown), into and out of a vehicle, such as a conventional pick-up truck 12. See FIG. 1. For convenience, this disclosure may refer to the loading and unloading of lawn mowers. However, this is not intended to be limiting. Likewise, references to a pick-up truck 12 are by way of example only and are not intended to be limiting; other types of vehicles may be used in connection with ramp 10.

As is known, the pick-up truck 12 has a bed 14, which lies in a substantially horizontal plane; the bed has an edge 16. Pick-up truck 12 further includes a conventional hinged tailgate 18, movable between an open position and closed position (not shown) in a manner known in the art. Tailgate 18 has leading edge 20.

Figure 2:
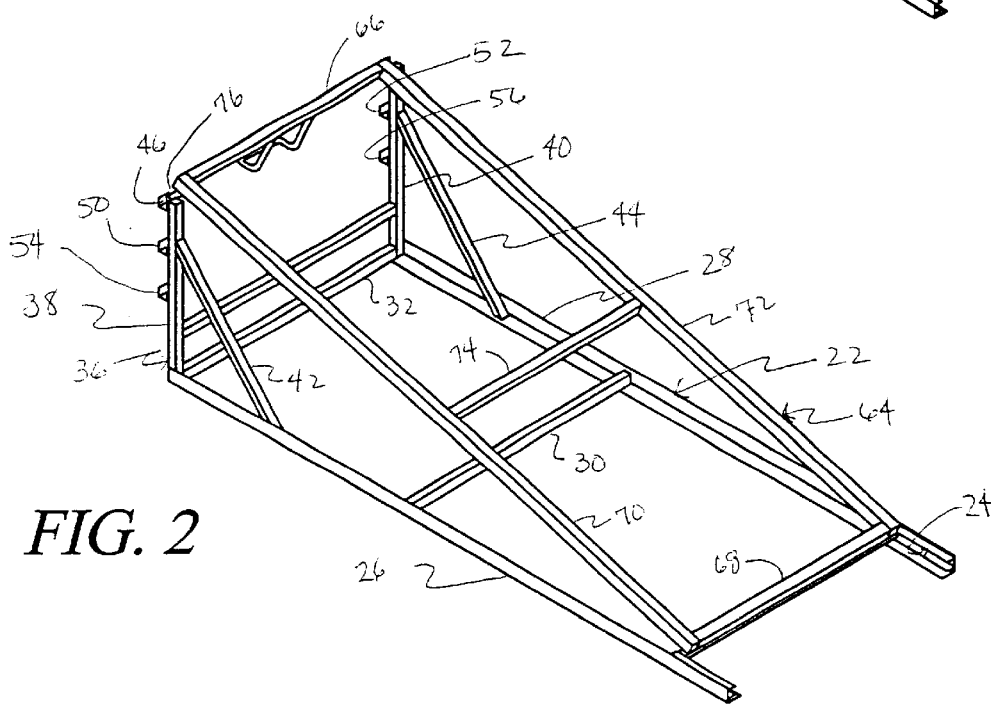
FIG. 2 is an isometric view of the ramp shown in FIG. 1 with the runway removed for clarity.
Figure 4:
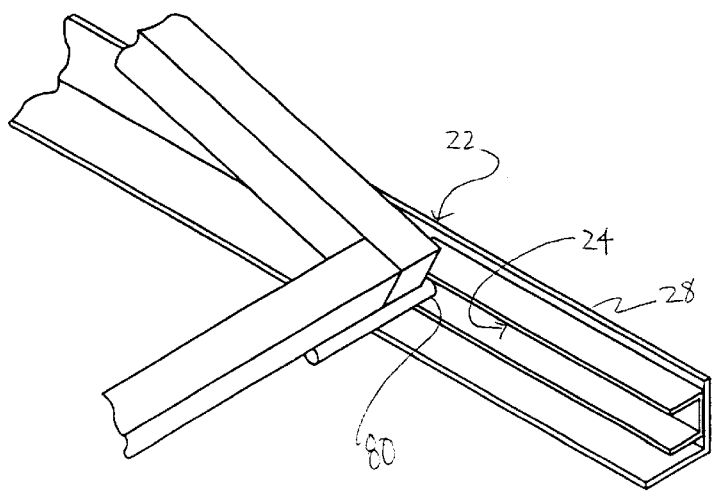
FIG. 4 is an enlarged view of the base shown in FIG. 2, illustrating a guide structure in the form of a channel and cooperating protrusion, with portions broken away for convenience.
Figure 5:
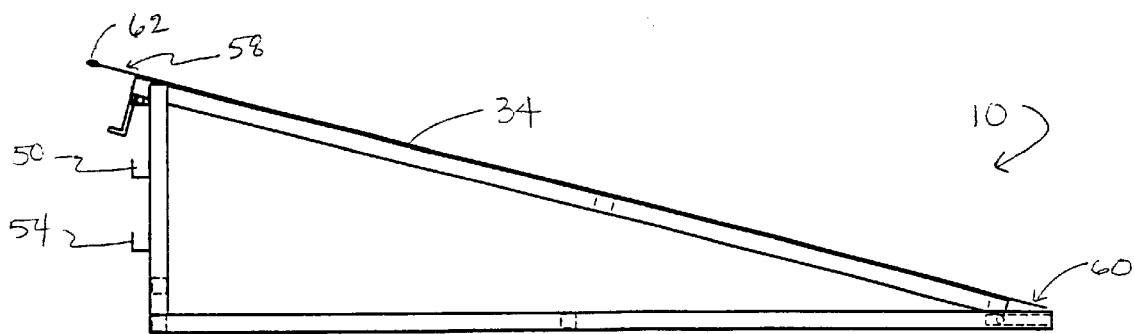
FIGS. 5–8 are side views of the runway shown in FIG. 1 moved between a plurality of positions relative to the base.
Figure 6:
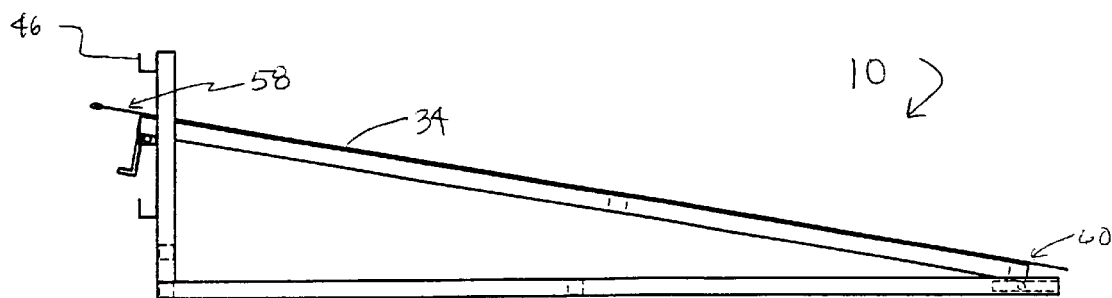
Figure 7:
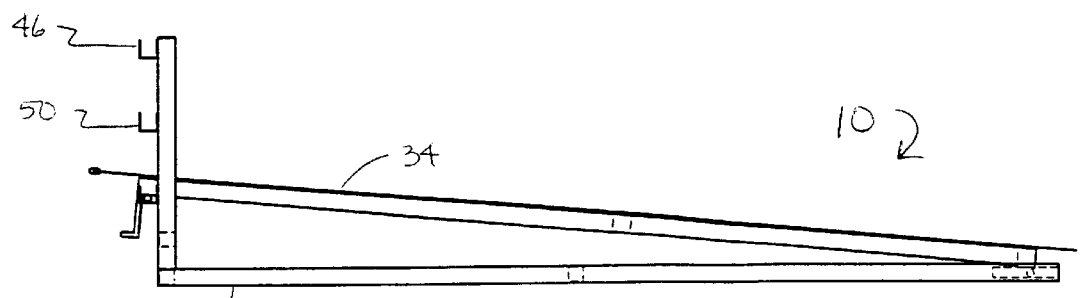
Figure 8:
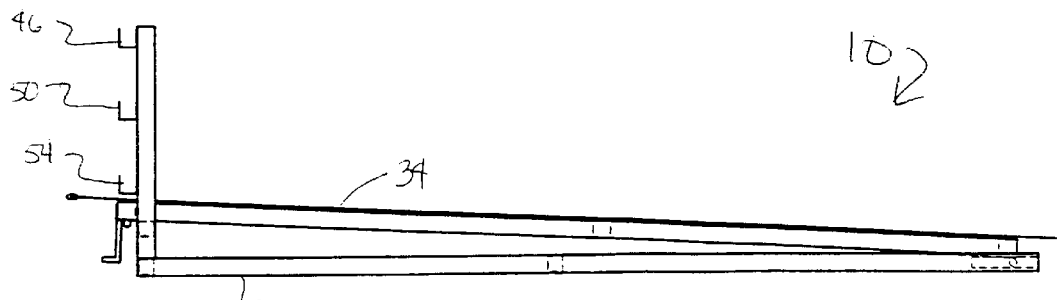

As best shown in FIGS. 2, 4, the ramp 10 of the present invention comprises a base 22 having a first guide structure 24 defined thereon. More specifically, the base 22 comprises two horizontally-positioned side bars 26, 28 (FIG. 2) forming a plane therebetween. A plurality of cross bars 30, 32 extends between the horizontal side bars 26, 28 of the base 22 and serves to stabilize the ramp 10. Any suitable number of cross bars 30, 32 may be used so long as the base 22 is sufficiently stabilized; in the preferred embodiment, two cross bars are used.

The first guide structure 24 of the base 22 may take on any size and shape suitable to facilitate guiding runway 34 (FIG. 1) in a manner consistent with the invention described herein. In the preferred embodiment, first guide structure 24 comprises at least one channel along at least a portion of each horizontal side bar 26, 28 of the base 22.

An upright member 36 (FIGS. 1–3) is fixed to the base 22 and extends upwardly therefrom. The upright member 36 may take on any size and shape suitable to support runway 34 (FIG. 1) and a load, such as a lawnmower (not shown), on the runway 34. In the preferred embodiment, the upright member 36 comprises two substantially vertical metal bars 38, 40 (FIG. 2), forming a plane therebetween, each vertical bar 38, 40 fixed at an end to one of the horizontal side bars 26, 28 of the base 22. The plane formed by the bars 38, 40 of the upright member 36 lies at an angle relative to the plane formed by the horizontal side bars 26, 28 of the base 22. In the most preferred embodiment, the plane formed by the vertical bars 38, 40 of the upright member 36 is substantially perpendicular to the plane formed by the horizontal side bars 26, 28 of the base 22. The two vertical bars 38, 40 forming the upright member 36 are each shored up with a brace 42, 44 in a manner known in the art.

Figure 3:
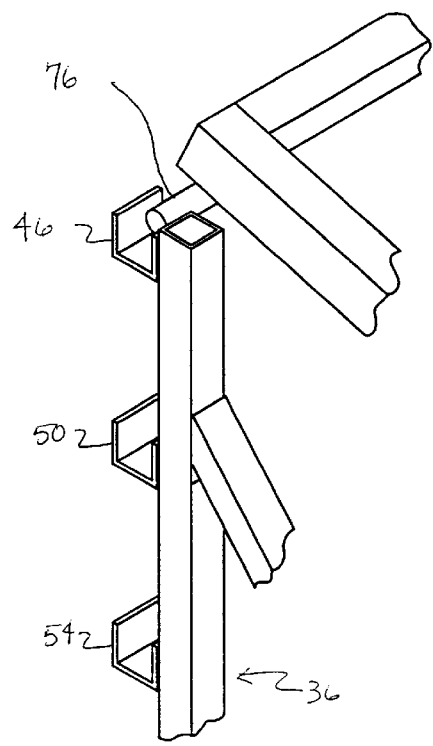
FIG. 3 is an enlarged view of the ramp shown in FIG. 2, illustrating a series of hooks and cooperating protrusions for adjusting the height of the runway relative to the base, portions being broken away for convenience.

As best shown in FIGS. 2, 3, a plurality of supporting structures 46, 48, 50, 52, 54, 56 are defined on each of the vertical bars 38, 40 of the upright member 36 at differing elevations above the base 22. In the most preferred embodiment, the supporting structures 46, 48, 50, 52, 54, 56 comprise hooks adapted in size and shape to receive a cooperating member of the runway 34, as described in more detail herein below. The supporting structures are positioned along the two vertical bars 38, 40 of the upright member 36 at substantially equally spaced intervals. In the preferred embodiment, three pair of supporting structures are positioned along the vertical bars; however, it should be understood that as many pair as desired could be placed therealong.

Runway 34 has a first end 58 and a second end 60 movable between a plurality of predetermined positions relative to the base 22, as shown in FIGS. 5–8. The runway 34 may be made of any suitable material, such as steel, and may be made in any suitable manner known in the art. Most preferably, the runway 34 is made of expanded metal. A protective member 62 (FIG. 5), such as a rubber pad, is positioned about at least a portion of the first end 58 of the runway 34 to prevent and/or reduce damage to the tailgate 18 (FIG. 1) of a truck 12, should the tailgate 18 and the leading edge of the runway 34 bump together.

The runway 34 may be positioned on or made integral with a runway support 64 (FIG. 2). In the preferred embodiment shown in FIG. 1, the runway support 64 comprises a first end bar 66, a second end bar 68, and opposed side bars 70, 72, connected at their ends to form a substantially rectangular support structure. Cross member 74 lies between the first and second end bars, 66, 68, respectively, and perpendicularly to the opposed side bars 70, 72, to further stabilize the runway 34.

A plurality of supported members, such as 76 (FIG. 3), is fixed to the first end of the runway support 64 and is selectively engagable with one of the supporting structures 46, for example, to elevate the first end of the runway 34 above the base 22. The supported members, such as 76, may take on any desirable size and shape and may be made of any suitable material known in the art. In the preferred embodiment, the supported members comprise protrusions operatively engagable with the supporting structures. Any suitable number of protrusions may be used, so long as the number used is sufficient to satisfactorily position the runway 34 relative to the base 22. In the preferred embodiment, one protrusion, such as 76, extends outwardly from each side of the front end of the runway support 64.

A second guide structure 78 is fixed to the second end 60 of the runway support 64 and is operatively engaged with the first guide structure 24 of the base 22, so that the second end 60 of the runway 34 may move relative to the base 22 when the elevation of the first end 58 of the runway 34 is adjusted. See FIGS. 5–8. The second guide structure 78 may take on any size and shape so long as it satisfactorily cooperates with the first guide structure 24 to guide the movement of the runway 34 between the positions shown in FIGS. 5–8. In the preferred embodiment, the second guide structure 78 comprises two protrusions, such as 80 (FIG. 4), each extending outwardly from the second end of the runway support 64, and sized and shaped to slide within the channel 24 of the base 22.

In operation, an operator moves the tailgate 18 of a pick-up truck 12 to the lower position. FIG. 1. Then the truck 12 is positioned such that the leading edge 20 of the tailgate 18 is adjacent, or nearly adjacent, to the leading edge of the runway 34. The operator then lifts up the leading edge of the runway 34 so that the protrusions, such as 76 (FIG. 3), are no longer resting on their supporting structures, such as 46, and positions the protrusions 76 in the desired supporting structures (FIGS. 5–8) so as to position the leading edge of the runway 34 at the desirable elevation relative to the leading edge 20 of the tailgate 18. Movement of the leading edge of the runway 34 causes the protrusions 80 (FIG. 4) of the second end of the runway 34 to slide within the channel 24 (FIG. 4), which ensure that the runway 34 maintains proper alignment while it is being positioned.

Figure 9:
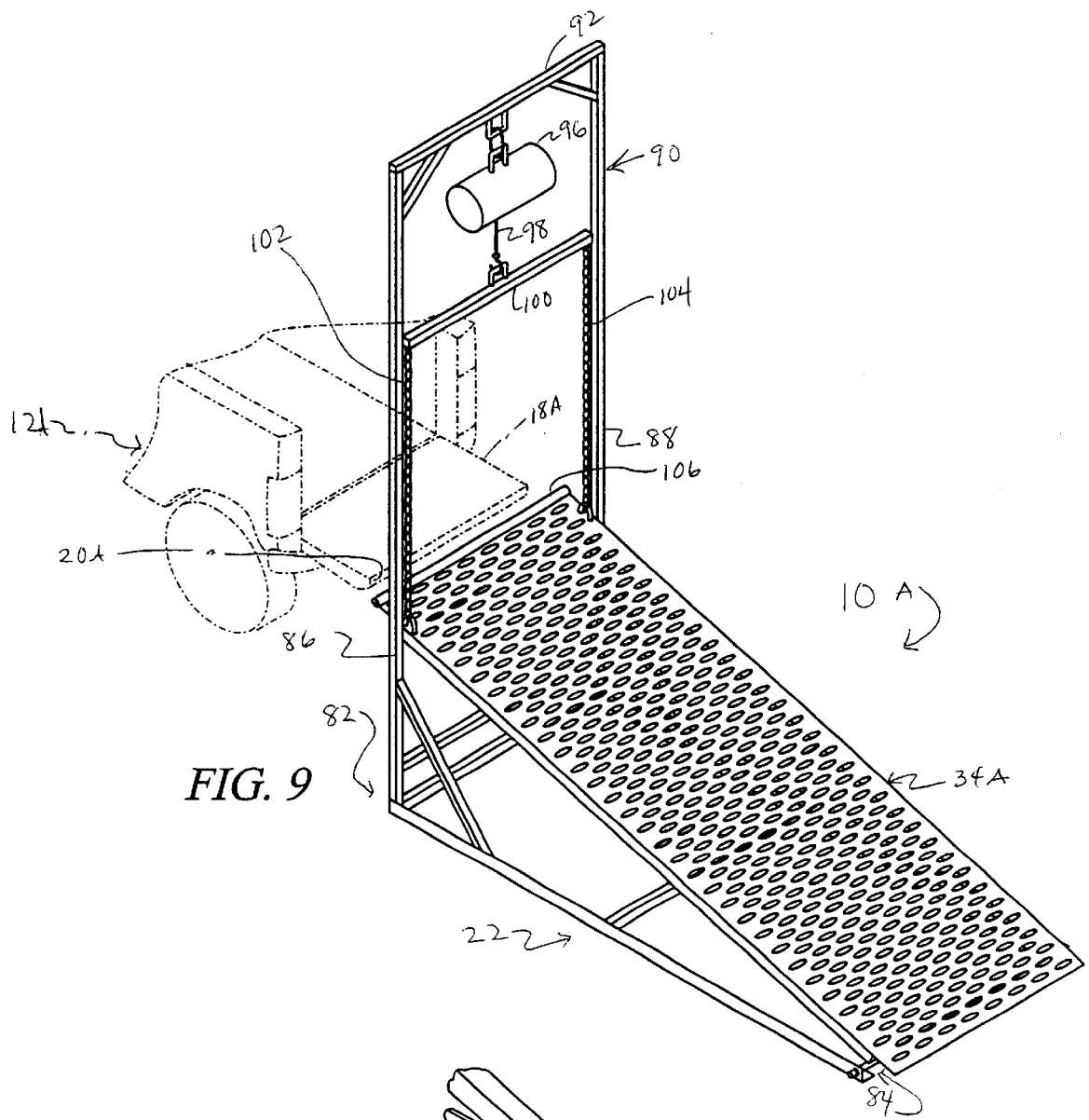
FIG. 9 is an isometric view of another preferred embodiment of a ramp, including a runway and frame, the ramp constructed in accordance with the present invention.
Figure 10:
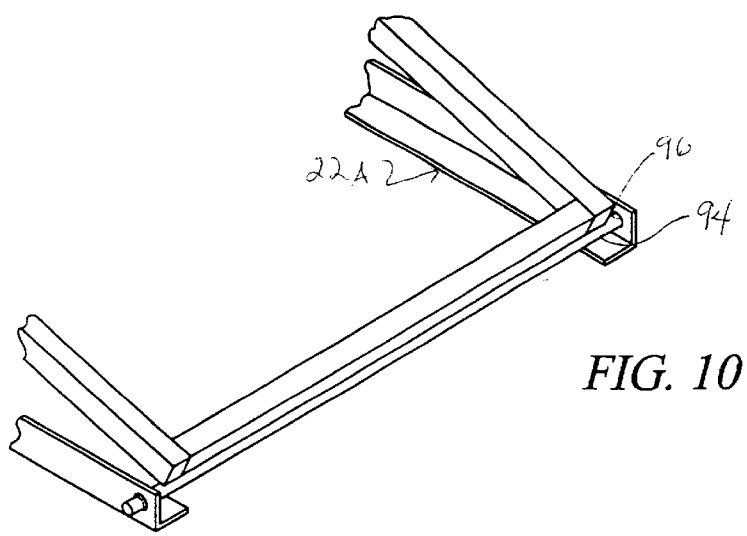
FIG. 10 is an isometric view of the ramp shown in FIG. 9, illustrating one end of the runway fixed to the frame.

In another preferred embodiment, shown in FIGS. 9 and 10, a movable ramp 10A is disclosed, where like elements are designated with the suffix "A." Ramp 10A comprises a base 22A having a first end 82 and a second end 84. Opposed side members 86, 88 of a frame 90 are fixed at the first end of the base and extend upwardly therefrom. A top member 92 connects the two side members 86, 88 of the frame 90. The base 22A and the frame 90 may be made of any suitable material, such as wood or metal, so long as they have sufficient structural integrity to support a runway 34A, a load on the runway and an operator.

Runway 34A, comprised of expanded metal, is fixed to the second end 84 of the base 22A via a metal rod 94 (FIG. 10) that is positioned through a corresponding hole 96 in the base 22A. The runway 34A (FIG. 9) is rotatable via the rod 94 about at least a portion of the base 22A. As a result, the runway 34A is movable between a plurality of positions relative to the base.

Movement of the runway 34A is accomplished by a runway moving device 96 fixed to the top of the frame 90 and connected to the leading edge of the runway 34A. In the preferred embodiment, the runway moving device 96 comprises a winch, which may be either manual or electric. If the electric winch is used, then a power supply, electric lines and an on/off switch (not shown) would need to be installed relative to the frame in a manner known in the art.

A line 98 extends downwardly from the winch 96 and connects to a horizontal bar 100. Two lines 102, 104, one at each end of the horizontal bar 100, extend downwardly to opposed sides of the runway 34A. Operation of the winch 96 raises and lowers line 98 causing horizontal bar 100 to move accordingly, resulting in desired movement of the leading edge of the runway 34A.

Most preferably, the leading edge of the runway 34A comprises a bar and a protective element 106, such as a rubber pad known in the art, positioned about the bar, which prevents and/or reduces damage to the tailgate 18A, when the pick-up truck 12A is positioned adjacent to the ramp 10A.

In operation, a user moves the tailgate 18A of a pick-up truck 12A to the lower position. FIG. 9. Then the truck 12A is positioned such that the tailgate 18A is adjacent, or nearly adjacent, to the runway 34A. The operator then operates winch 96 to position the leading edge of the runway 34A substantially adjacent to the leading edge 20A of the tailgate 18A.

Thus, although there have been described particular embodiments of the present invention of a new and useful ADJUSTABLE RAMP, it is not intended that such references be construed as limitations upon the scope of this invention except as set forth in the following claims.

What is claimed is:

1. A ramp comprising:
    a base having a first guide structure defined thereon;
    upright member fixed to and extending upward from the base, the upright member having a plurality of supporting structures defined thereon at differing elevations above the base;
    a runway having a first end and a second end;
    a plurality of supported members fixed to the first end of the runway and selectively engagable with one of the supporting structures to elevate the first end of the runway above the base; and
    a second guide structure fixed to the second end of the runway and operatively engaged with the first guide structure of the base, so that the second end of the runway may move linearly relative to the base when the elevation of the first end of the runway is adjusted.

2. The ramp of claim 1, the upright member and the base forming an angle therebetween, wherein the angle is about a 90° angle.

3. The ramp of claim 1, the first guide structure comprising at least one channel along at least a portion of the base, each channel adapted in size and shape to receive the second guide structure of the runway.

4. The ramp of claim 1, the plurality of supported members comprising protrusions operatively engaged with the supporting structures.

5. The ramp of claim 4, wherein the protrusions extend outward from the runway.

6. The ramp of claim 5, wherein the supporting structures comprise hooks, each hook adapted in size and shape to receive the protrusion.

7. The ramp of claim 1, wherein the runway is comprised of expanded metal.

8. An adjustable ramp comprising:
    a base having a first portion and a second portion, each portion lying in a plane, the plane formed by the first portion being substantially perpendicular to the plane formed by the second portion, the second portion having a channel along at least a portion thereof;
    a runway having a first end and a second end, the runway positionable at a plurality of positions along the first portion of the base, the runway comprising at least two protrusions extending outwardly from the first end and at least one guide member extending outwardly from the second end, each guide member adapted in size and shape to move within the channel of the base; and
    a plurality of protrusion receiving members along the first portion of the base, each protrusion receiving member adapted in size and shape to receive the protrusion,
    wherein movement of the runway between positions on the first portion causes each guide member to move within the channel.

9. The adjustable ramp of claim 8, wherein the protrusion receiving members are positioned along the first portion of the base at substantially equally spaced intervals.

10. The adjustable ramp of claim 9, wherein the protrusion receiving members comprise hooks.

11. The adjustable ramp of claim 8, wherein the runway is comprised of expanded metal.

12. A movable ramp comprising:
    a base having a first end and a second end;
    a frame having a top, the frame fixed to the first end of the base and extending upwardly there from;
    a runway having a leading edge and trailing edge and movable between a plurality of positions, the trailing edge of the runway fixed to the second end of the base and rotatable about at least a portion thereof; and a runway moving device fixed to the top of the frame and connected to the leading edge of the runway for moving the runway between a plurality of positions, the runway moving device including a winch and a horizontal bar engaging the winch, the bar having two lines extending downwardly from the bar and engaging the leading edge of the runway.

13. The movable ramp of claim 12, wherein the runway is comprised of expanded metal.

14. The movable ramp of claim 12, the leading edge of the runway comprising a bar.

15. The movable ramp of claim 14 further comprising a protective element positioned about the bar.

* * * * *

UNITED STATES PATENT AND TRADEMARK OFFICE
CERTIFICATE OF CORRECTION

PATENT NO. : 6,484,343 B1
DATED : November 26, 2002
INVENTOR(S) : Andy Phillips

It is certified that error appears in the above-identified patent and that said Letters Patent is hereby corrected as shown below:

<u>Title page,</u>
Item [76], the Inventor's Name should read:
-- Andy Phillips --

Signed and Sealed this

Twenty-ninth Day of April, 2003

JAMES E. ROGAN
*Director of the United States Patent and Trademark Office*